United States Patent
Karr et al.

(10) Patent No.: US 7,664,839 B1
(45) Date of Patent: Feb. 16, 2010

(54) AUTOMATIC DEVICE CLASSIFICATION SERVICE ON STORAGE AREA NETWORK

(75) Inventors: Ronald S. Karr, Palo Alto, CA (US); Chio Fai Aglaia Kong, San Jose, CA (US); Sung-Wook Ryu, Mountain View, CA (US); Srihari Bathini, Sunnyvale, CA (US); De-Chih Chien, Saratoga, CA (US)

(73) Assignee: Symantec Operating Corporation, Cupertino, CA (US)

( * ) Notice: Subject to any disclaimer, the term of this patent is extended or adjusted under 35 U.S.C. 154(b) by 707 days.

(21) Appl. No.: 10/881,837

(22) Filed: Jun. 30, 2004

(51) Int. Cl.
*G06F 15/173* (2006.01)
(52) U.S. Cl. .................. 709/223; 709/227; 709/229
(58) Field of Classification Search ......... 709/220–223, 709/227–229
See application file for complete search history.

(56) References Cited

U.S. PATENT DOCUMENTS

| | | | |
|---|---|---|---|
| 6,199,112 B1 * | 3/2001 | Wilson ........................ 709/227 |
| 6,813,669 B1 * | 11/2004 | Cato et al. ................... 710/302 |
| 7,194,538 B1 * | 3/2007 | Rabe et al. ................... 709/224 |
| 7,203,730 B1 * | 4/2007 | Meyer et al. ................. 709/213 |
| 2002/0129216 A1 * | 9/2002 | Collins ........................ 711/170 |
| 2003/0172146 A1 * | 9/2003 | Collins ........................ 709/223 |
| 2004/0049564 A1 * | 3/2004 | Ng et al. ...................... 709/223 |
| 2004/0085907 A1 * | 5/2004 | Daggett ....................... 370/252 |
| 2004/0205089 A1 * | 10/2004 | Alon et al. ................... 707/200 |
| 2004/0228290 A1 * | 11/2004 | Graves ........................ 370/257 |

* cited by examiner

*Primary Examiner*—Salad Abdullahi
(74) *Attorney, Agent, or Firm*—Campbell Stephenson LLP (57) ABSTRACT

A method, system, computer system, and computer-readable medium to classify a storage device on a SAN prior to allocating the storage device for data storage. A device accessible via a storage area network is detected, and access to the device by a node on the storage area network is established. The device is accessed by a recognizer to determine the type of the device and information about contents of the device. The type of the device can be checked for compatibility with a requester sending a request for a storage device. By checking the compatibility between storage devices and nodes before allocation, spending resources to allocate incompatible storage is avoided and costs of storage management are reduced. Classification information about devices and nodes can be stored in a persistent data store that can be accessed by nodes connected to the SAN.

29 Claims, 9 Drawing Sheets

AUTOMATIC DEVICE CLASSIFICATION SERVICE ON STORAGE AREA NETWORK

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Before the proliferation of storage area networks (SANs), the Small Computer Systems Interface (SCSI) protocol was one method of communication between computer systems and devices. The development of SCSI increased the number of devices (printers, disk drives, tapes, and other peripheral devices) that could be used by a computer system by defining a bus so that several devices could be chained together into a channel and controlled from a single I/O channel controller. Bus-oriented I/O channels improved the amount of storage capacity that could be supported by a single server computer system and enabled a single pool of storage to be used for a number of different applications hosted by that server computer system.

Using SCSI, physical interfaces from computer systems to storage were parallel channels supporting a small number of SCSI devices. However, parallel SCSI imposed physical limitations on the number of devices that could be supported by the bus, as well as limitations on the amount of distance that could separate a device from its respective host. These limitations restricted the size to which networks sharing storage devices could grow, and other technologies were developed to decouple storage capacity from host servers. Today, technologies such as fibre channel and infiniband allow storage to exist in storage area networks (SANs), where a virtually unlimited number of storage devices can be shared by a virtually unlimited number of nodes without limitations on the amount of distance separating the nodes from the storage devices.

A SAN typically includes a network of multiple servers and connected storage devices. Generally, a client computer system requests a server hosting a given application to store data. The application server stores the data on behalf of the client and retrieves the data upon request by the client. If sufficient storage space is not available to the application server to store the data, the application server requests a storage server to allocate additional storage devices that the application server can use to store the data on behalf of the client. While SANs provide access to almost unlimited storage for distributed nodes, SANs introduce the complexity of managing a very large number of devices. In most large environments, these devices are likely to be produced by different manufacturers and configured for operation under different operating systems and in accordance with different formats and/or protocols. Furthermore, because many nodes may be capable of storing data on a single disk, there is a need for access control and coordination between nodes to use the storage devices effectively.

When a request for storage devices is made by a node, the storage server typically searches for free space on storage devices on the SAN. When sufficient free space to store the data is located, the disks containing that free space are allocated to the requesting node. Allocating a disk to a node involves enabling the node to access the disk (which is sometimes also referred to as establishing a connection between the node and the disk, making the disk available to the node, or granting the node access to the disk). Enabling the node to access the disk is an expensive process; for example, changes to many configuration files of servers, switches, and storage arrays on the SAN may be necessary, and interrelationships between these configuration files must be preserved. Typically, once access to the disk is granted to the node, the node determines information such as the type of the disk, format of the disk, and disk signature. However, the disk allocated to the node may have a type, format, or signature that is incompatible with the node, such that the resources used in enabling the node to access the disk have been wasted.

When a device is moved from one location to another on a SAN, such as from one node to another, traditionally it has been difficult to ascertain whether the device is new or whether the device has been moved. If the disk contains data, and the disk is allocated to an incompatible node, the incompatible node is unlikely to recognize that data are present and may reformat the disk or overwrite the existing data. To solve this problem, information such as the type, format, and signature of the device are needed prior to allocating the disk to a particular node for data storage. Previously, no mechanism existed to determine whether information about the device is already known.

What is needed is the knowledge whether a storage device on a SAN is compatible with a node prior to allocating the storage device to the node for data storage. Such a capability is needed for all types of storage devices, including storage arrays with groups of disks as well as unorganized individual disks (also referred to as JBOD (just a bunch of disks)). Once information about the storage device has been determined, the information should be made available to other nodes on the SAN. For example, preferably the information can be stored in a persistent data store on the SAN.

SUMMARY OF THE INVENTION

The present invention provides a method, system, computer system, and computer-readable medium to classify a storage device on a SAN prior to allocating the storage device to a node for data storage. In one embodiment, a method includes detecting a device accessible via a storage area network and establishing access to the device by a node on the storage area network. The method further includes accessing the device to determine the type of the device and information about the contents of the device. A recognizer running on the node can perform accessing the device. The type of the device can be checked for compatibility with a requester (such as an application server) sending a request for a storage device to store data. If the type of the device is compatible with the requester, the device can be allocated to the requester. A storage server can search for available and compatible storage devices and allocate the device to the requesting node based upon compatibility, distance, existing connections, and other such criteria. By checking the compatibility between storage devices and nodes before allocation, spending resources to allocate incompatible storage is avoided and overhead costs of storage management are reduced.

A unique identifier for the storage device within the SAN is generated when the storage device is first detected by a node on the SAN. Classification information about storage devices can be persistently stored. Rather than re-classify a disk when the disk is re-used, disk classification information can be obtained from the persistent data store using identifying data used to generate the unique identifier.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

The present invention provides a method, system, computer system, and computer-readable medium to classify a storage device on a SAN prior to allocating the storage device for data storage. In one embodiment, a method includes detecting a device accessible via a storage area network and establishing access to the device by a node in the storage area network. The method further includes accessing the device to determine the type of the device and information about the contents of the device. The node can perform accessing the device. The type of the device can be checked for compatibility with a requester sending a request for a storage device to store data. If the type of the device is compatible with the requester, the device can be allocated to the requester. A storage server can search for available and compatible storage devices and allocate the device to the requesting application server. By checking the compatibility between storage devices and nodes before allocation, spending resources to allocate incompatible storage is avoided and overhead costs of storage management are reduced.

A unique identifier for the storage device within the SAN is generated when the storage device is first detected by a node on the SAN. Classification information about storage devices can be persistently stored. Rather than re-classify a disk when the disk is re-used, disk classification information can be obtained from the persistent data store using identifying data that was used to generate the unique identifier.

Figure 1:
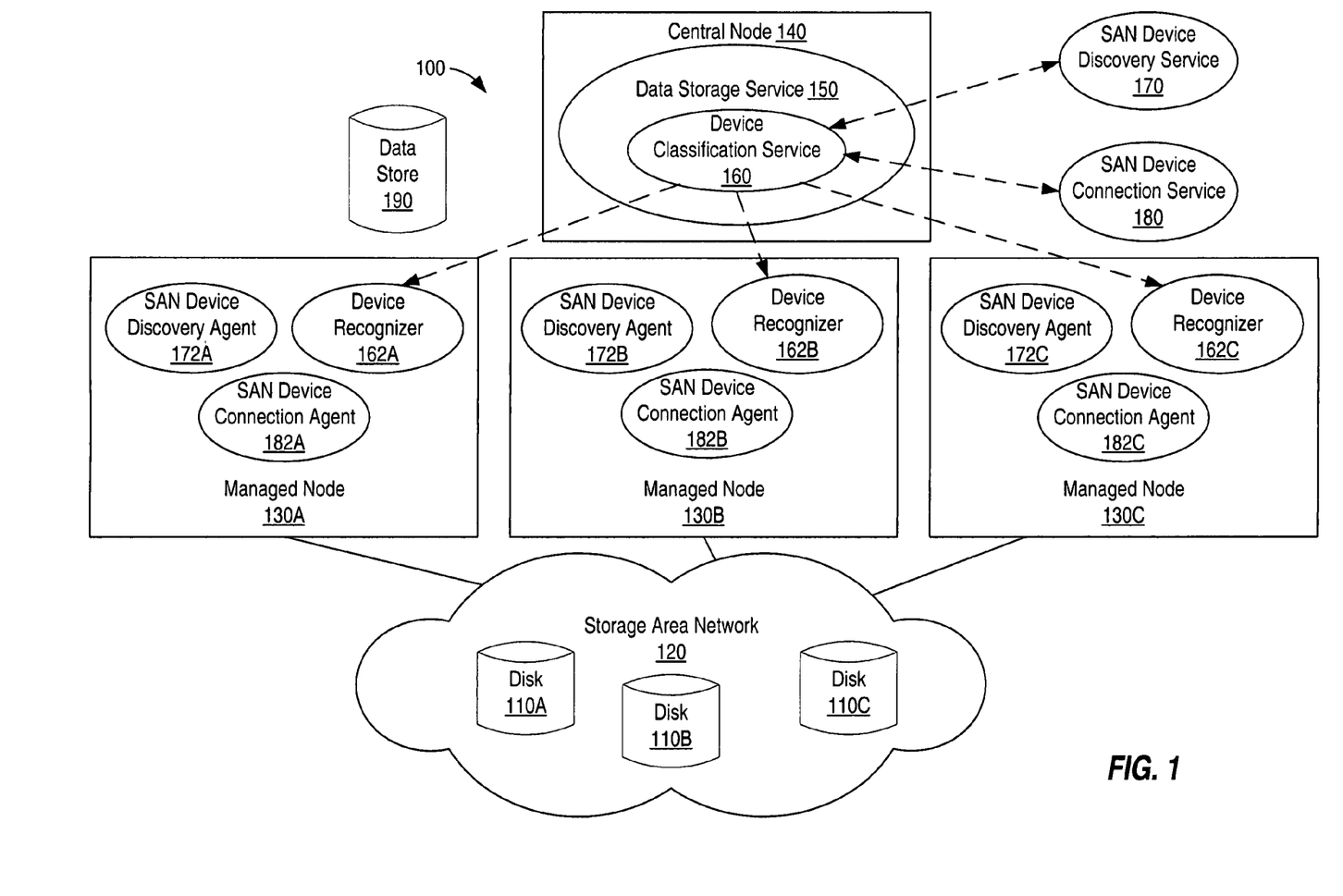
FIG. 1 provides an example of one embodiment of a system implementing the present invention.

FIG. 1 provides an example of one embodiment of a system 100 implementing the present invention. Disks 110A, 110B, and 110C are connected via storage area network (SAN) 120 and can be used to provide storage for nodes 130A, 130B, and 130C, each of which is also connected to SAN 120. While all storage devices shown are labeled as disks, one of skill in the art will recognize that the present invention is operable with arrays of disks, individual disks, and other types of storage devices, and is not limited to disks. Nodes 130A, 130B, and 130C are managed by central node 140, which fills the role of a storage server. Nodes 130A, 130B, and 130C may also serve as application servers for one or more application programs to other client computer systems (not shown). In some environments, it may be appropriate for managed nodes 130A, 130B, and 130C to provide the storage-related services shown in FIG. 1, enabling application server resources to be used for application needs. Other nodes (not shown) that are not managed by central node 140 may be connected to SAN 120; for example, other nodes may serve as application servers.

Central node 140 provides data storage service 150 to managed nodes 130A, 130B, and 130C, as well as to other nodes (not shown) connected to the SAN. Data storage service 150 provides central administration of storage on SAN 120. Data storage service 150 includes a device classification service 160. Device classification service 160 communicates with respective device recognizer agents 162A, 162B, and 162C on respective managed nodes 130A, 130B, and 130C. One of skill in the art will recognize that the data storage and device classification functionality provided by these two services may be provided in other ways than as a service, and that device classification service 160 may be a separate service rather than included within data storage service 150. Furthermore, software implementing data storage service 150 and device classification service 160 need not reside on the same node.

Also provided within system 100 are a SAN device discovery service 170 and a SAN device connection service 180. SAN device discovery service 170 discovers when devices become available on SAN 120, and SAN device connection service 180 makes a SAN connection to a given device available to a node using techniques such as zoning and LUN masking. One of skill in the art will recognize that the device discovery and device connection functionality provided by these services may be provided in other ways than as a service, and that software implementing these services may also reside on central node 140 or on different nodes. The functionality of services 150, 160, 170, and 180 may be provided as different functionality within a single service or in other possible combinations as well.

SAN device discovery service 170 works in conjunction with SAN device discovery agents 172A, 172B, and 172C on respective managed nodes 130A, 130B, and 130C to discover when a new device becomes available on SAN 120. SAN device discovery agents 172A, 172B, and 172C discover and monitor devices using in-band and out-of-band protocols, such as Simple Network Management Protocol (SNMP) or SCSI, or by querying a fibre channel name service. In one embodiment, SAN device discovery agents 172A, 172B, and 172C provide information to device classification service 160, generate globally unique identifiers for storage devices, and initiate classification of storage devices. By generating globally unique identifiers for storage devices, information about a particular device can be maintained when the storage device is moved from one location on the SAN to another. In one embodiment, SAN device discovery service 170 periodically contacts SAN device discovery agents 172A, 172B, and 172C to gather information about devices, nodes, and accessibility. SAN device discovery service 170 also stores data about the SAN, nodes, and devices in data store 190.

SAN device connection service 180 makes a connection to a device available to a node. This connection may be a SAN connection made available using techniques such as zoning and LUN masking. Alternatively, the connection may be an Internet SCSI (iSCSI) TCP/IP connection established between the node and the device. In the example shown, SAN device connection service 180 works in conjunction with SAN device connection agents 182A, 182B, and 182C running on managed nodes 130A, 130B, and 130C. In one embodiment, SAN device connection service 180 and SAN device connection agents 182A, 182B, and 182C incorporate functionality compatible with different storage device vendor Application Program Interfaces (APIs) to enable communication with the hardware involved. SAN device connection service 180 and SAN device connection agents 182A, 182B, and 182C may, for example, use zoning APIs provided by switch vendors to establish connectivity and security for nodes to access SAN devices via respective switches. In an embodiment in which a TCP/IP connection is made between the node and the device, the node itself may issue commands directly to the device.

Data store 190 stores information gathered by the SAN device discovery service 170. For example, the classification of a storage device and identifiers for units of storage can be stored in data store 190. Other information may also be stored in data store 190, such as information about nodes 130A, 130B, and 130C; data about SAN 120; assignments of storage to nodes; and so on. The form of data store 190 may vary; in some embodiments, data store 190 may be a database, while in other embodiments, data store 190 may include one or more files. Other configurations of data store 190 are also within the scope of the invention.

Figure 2:
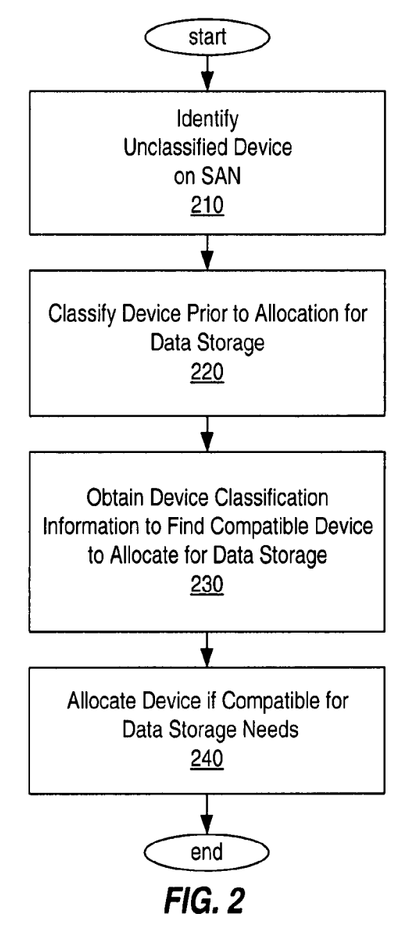
FIG. 2 provides a flowchart of a method of operation of the system of FIG. 1.

FIG. 2 provides a flowchart of a method of operation of the system of FIG. 1. In "Identify Unclassified Device on SAN" step 210, a discovery is made of a device on the SAN, where the device has not been classified. The device may have been newly added to the SAN, the zoning for the SAN may have changed to include the device in a different zone, a device that had been taken offline for maintenance may be returned to the SAN, and so on. In one embodiment, the unclassified device is discovered by a device discovery agent running on a managed node, such as one of SAN device discovery agents 172A, 172B, or 172C of FIG. 1 running on one of managed nodes 130A, 130B, or 130C.

In some situations, the unclassified device is directly connected to the SAN so that the device discovery agent can obtain device information via the SAN in-band protocol. In other situations, the device discovery agent becomes aware of the unclassified device indirectly. For example, one of the managed nodes may periodically poll a disk array using outband TCP/IP protocol to determine whether a new disk has been added to the disk array.

Referring again to FIG. 2, from "Identify Unclassified Device on SAN" step 210, control proceeds to "Classify Device Prior to Allocation for Data Storage" step 220. The unclassified device discovered in step 210 is classified prior to allocation of the device for data storage. In one embodiment, the device is classified by a device recognizer running on a managed node, such as one of device recognizers 162A, 162B, or 162C of FIG. 1 running on one of respective managed nodes 130A, 130B, or 130C.

Classifying the device may include determining a type of the device and information about contents of the device. Examples of types of disk devices are provided below:
  Unformatted Disk with no signature,
  Disk with Microsoft signature,
  Disk with Logical Volume Manager signature,
  Disk with Solaris signature,
  Disk with IBM AIX signature,
  Disk with VERITAS Volume Manager signature (Version), and
  Disk with VERITAS CDS (Common Data Sharing) signature.

As illustrated by the examples above, the type of the device may indicate a format, signature, and or other information identifying a storage manager that has been used to format and/or configure the device. Information about contents of the device may include whether data have been stored on the device. Classifying devices is discussed in further detail with reference to FIG. 3 below.

Referring again to FIG. 2, from "Classify Device Prior to Allocation for Data Storage" step 220, control proceeds to "Obtain Device Classification Information to Find Compatible Device to Allocate for Data Storage" step 230. In one embodiment, when additional storage is needed by a node, the node calls a data storage service, such as data storage service 150. In this embodiment, data storage service 150 calls device classification service 160 to obtain information about storage devices to find storage compatible with the node. In one embodiment, device classification service 160 is given a set of parameters describing the requesting node. Device classification service 160 then returns information about compatible storage available to meet the node's storage request.

Upon obtaining device classification information in step 230, control proceeds to "Allocate Device if Compatible for Data Storage Needs" step 240. In one embodiment, data storage service 150 selects and allocates a device using device classification information obtained from data store 190 of FIG. 1. This classification information is provided to data storage service 150 by device classification service 160. By using persistently-stored classification information to determine compatibility before allocating a device to a node, a connection to an incompatible device is thereby avoided.

Figure 3:
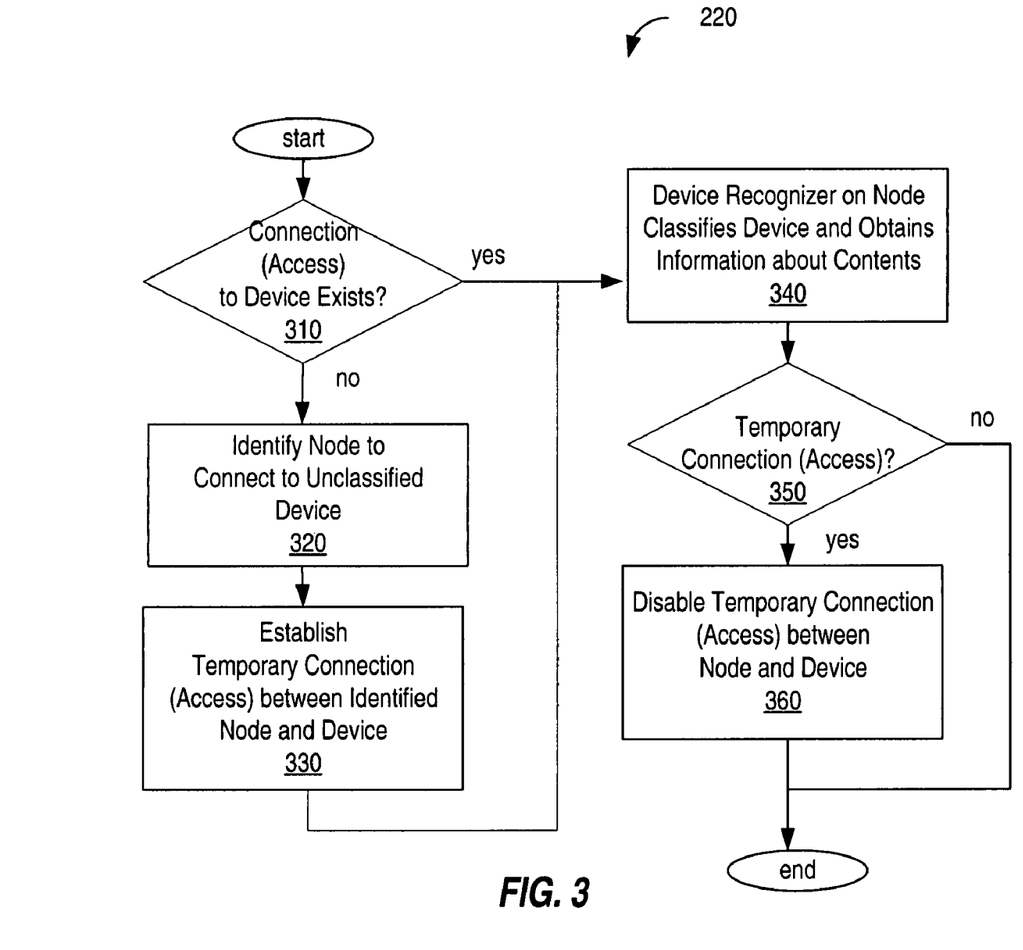
FIG. 3 provides a flowchart of the "Classify Device Prior to Allocation for Data Storage" step of the flowchart of FIG. 2.

FIG. 3 provides a flowchart of the "Classify Device Prior to Allocation for Data Storage" step 220 of FIG. 2. To classify the device, both a physical path to read data from the device and a connection to enable the node to access data from the device are needed. This connection can be established, for example, by access control techniques such as placing the node and the device in the same security zone, LUN masking, portbinding, and/or other techniques known in the art. Alternatively, a physical TCP/IP connection can be made between the node and the device. In FIG. 3, control begins at "Connection (Access) to Device Exists" decision point 310, where a determination is made whether any managed node already has a connection (access) to the device. In one embodiment, data storage service 150 of FIG. 1 searches data store 190 to identify a node having a connection (access) to the unclassified device.

If a connection does not exist at "Connection (Access) to Device Exists" decision point 310, control proceeds to "Identify Node to Connect to Unclassified Device" step 320, where a node is identified to connect (provide access) to the unclassified device. The identified node will have a recognizer program, such as one of device recognizers 162A, 162B, or 162C of FIG. 1. Various techniques can be used to identify a node to connect to the unclassified device, as determined by policy needs of the organization implementing or using the SAN. For example, a priority scheme may be designated in node configuration files, the node closest in proximity may be selected, or a node having additional bandwidth to serve storage requests may be identified. In one embodiment, data storage service 150 of FIG. 1 searches data store 190 to identify a node to connect to the unclassified device.

From "Identify Node to Connect to Unclassified Device" step 320, control proceeds to "Establish Temporary Connection (Access) between Identified Node and Device" step 330, where a temporary connection (access) is established between the node and the device. A connection service such as SAN device connection service 180 of FIG. 1 can be used to establish a connection between the device and the node. For example, one or more of the access control techniques mentioned above can be used to ensure that the identified node can access the device via a SAN connection. SAN device connection service 180 performs the complex manipulation of configuration files and mappings, which are not easily reversed once changed. Alternatively, a TCP/IP connection can be established between the identified node and the device.

If a connection exists or has been established at "Connection (Access) to Device Exists" decision point 310, control proceeds to "Device Recognizer on Node Classifies Device and Obtains Information about Contents" step 340. In this step, a device recognizer, such as one of device recognizers 162A, 162B, and 162C of FIG. 1, reads private information from the device. For example, the device recognizer may read a disk header to identify a signature for the device. Classifying the device may include determining a format, signature, type, and/or other information identifying a storage manager used to configure the device. A list providing examples of types of disk devices was given above. It is possible that a device recognizer cannot recognize the format of the device. In such a case, the device can be considered to be unformatted.

From "Device Recognizer on Node Classifies Device" step 340, control proceeds to "Temporary Connection (Access)" decision point 350. If a temporary connection was previously established in "Establish Temporary Connection (Access) between Identified Node and Device" step 330, control proceeds to "Disable Temporary Connection (Access) between Node and Device" step 360. To disable access to the device by the identified node, SAN device connection service 180 restores the configuration files and mappings to the state prior to establishing the temporary connection. If no temporary connection was previously established in "Establish Temporary Connection (Access) between Identified Node and Device" step 330, the flowchart of FIG. 3 for classifying the device in "Classify Device Prior to Allocation for Data Storage" step 220 of FIG. 2 is now complete.

Figure 4A:
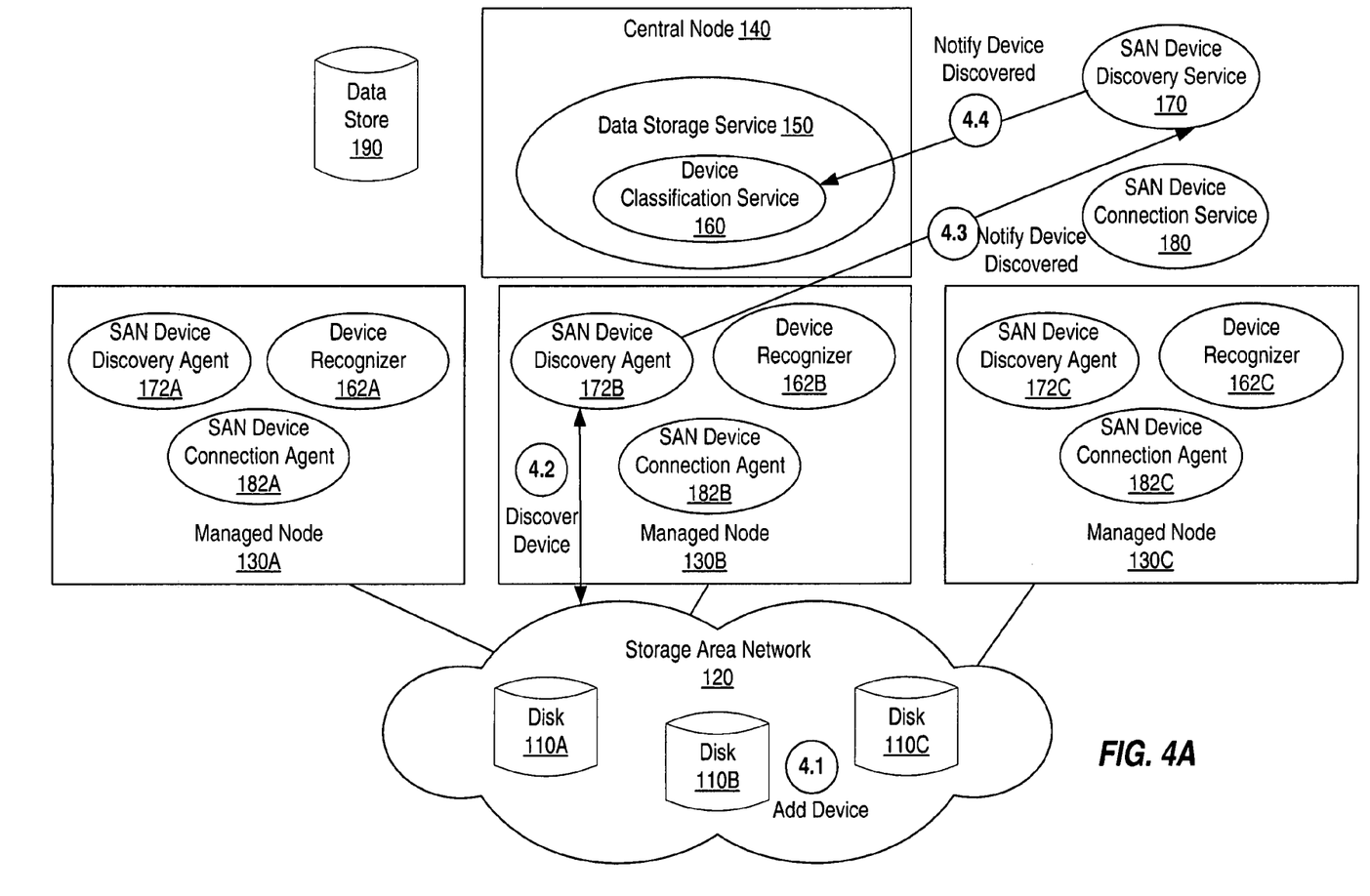
FIG. 4A shows an example of a data flow in discovering a device in the system of FIG. 1.

FIGS. 4A through 4D show the process of discovering a device added to a SAN and classifying the device in an example embodiment of the invention. Encircled action numbers are provided to guide the user through the process described. FIG. 4A shows an example of a data flow in discovering a device in the system of FIG. 1. In action 4.1, disk 10B is connected to SAN 120 for the first time. In action 4.2, SAN device discovery agent 172B running on managed node 130B discovers the newly-added disk 110B. In action 4.3, SAN device discovery agent 172B notifies SAN device discovery service 170 that a new device has been discovered, and, in action 4.4, SAN device discovery service 170 notifies device classification service 160.

Figure 4B:
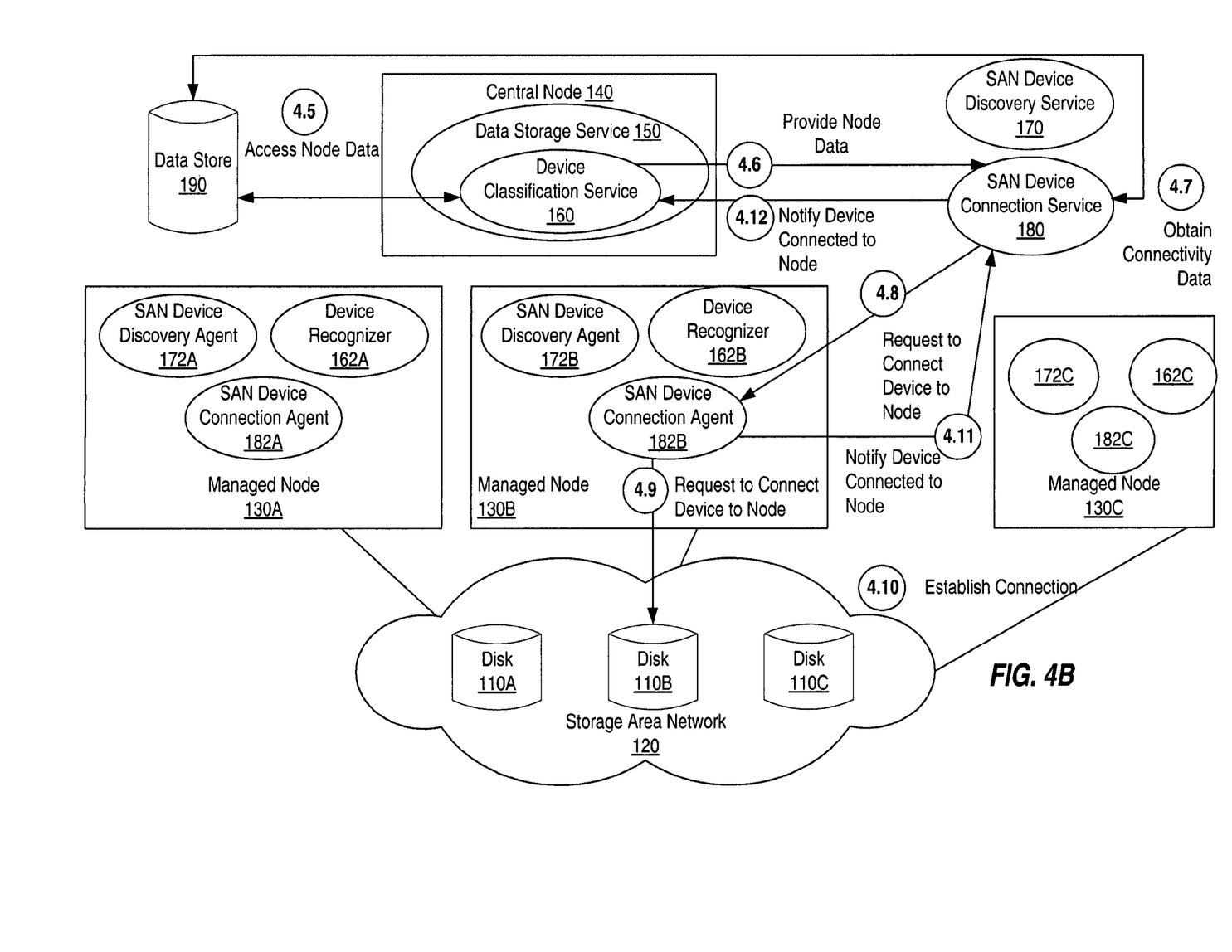
FIG. 4B shows an example of a data flow establishing access to the device discovered in FIG. 4A by a node in the system of FIG. 1.

FIG. 4B shows an example of a data flow in granting access to the device discovered in FIG. 4A for a node in the system of FIG. 1 (also referred to as establishing a connection between the device and the node). In action 4.5, after learning that a new device has been discovered, device classification service 160 accesses node data stored in data store 190 to identify whether any node on the SAN already has access to the device. In this example, no node has yet been granted access, and managed node 130B is identified as the node to receive access to disk 110B. As described above, the node to which access to the device is granted can be identified by software configured to implement a particular organization's policy. In action 4.6, device classification service 160 provides node data for the identified node to SAN device connection service 180. In action 4.7, SAN device connection service 180 may also access data store 190 to obtain connectivity information for the identified node.

In action 4.8, SAN device connection service 180 requests SAN device connection agent 182B running on the identified node 130B to establish a connection with disk 100B. In action 4.9, SAN device connection agent 182B performs the necessary calls to hardware APIs to make a physical SAN connection to disk 110B available to identified node 130B. For example, various commands to modify various configuration files may be invoked by SAN device connection agent 182B. In action 4.10, a connection between managed node 130B and disk 110B is established (e.g., the various configuration files are changed by running the commands). In action 4.11, SAN device connection agent 182B notifies SAN device connection service 180 that a connection was successfully established. In action 4.12, SAN device connection service 180 then notifies device classification service 160 that disk 110B is connected to node 130B.

Figure 4C:
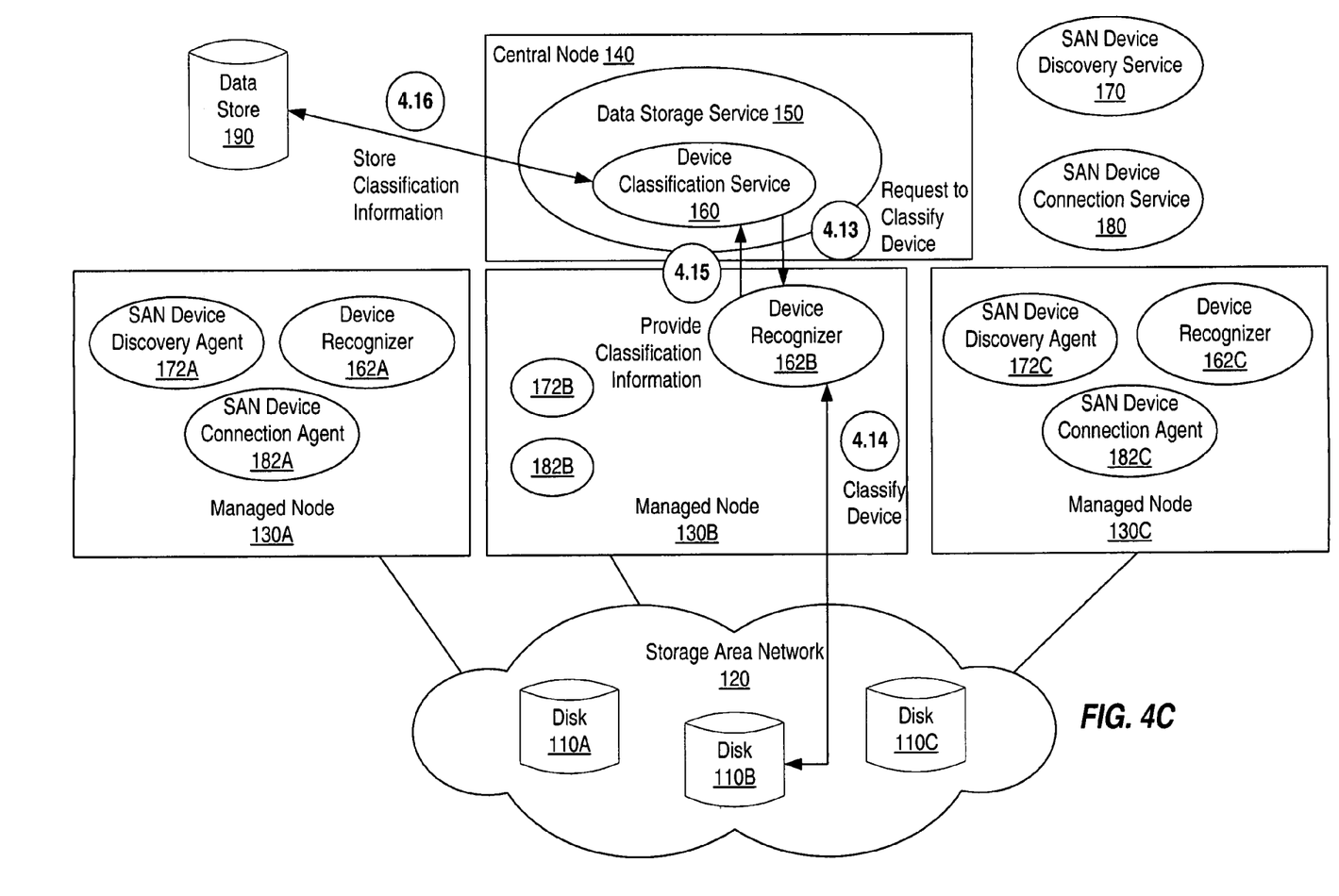
FIG. 4C shows an example of a data flow in classifying the device discovered in FIG. 4A.

FIG. 4C shows an example of a data flow in classifying the device discovered in FIG. 4A. In action 4.13, having established access between managed node 130B and disk 110B, device classification service 160 requests device recognizer 162B running on managed node 130B to classify disk 110B. In action 4.14, device recognizer reads private data from disk 110B and uses the data to classify disk 110B by assigning a type to disk 110B. In action 4.15, device recognizer 162B provides classification information for disk 110B to device classification service 160. In action 4.16, device classification service 160 stores classification information for disk 110B in data store 190.

Figure 4D:
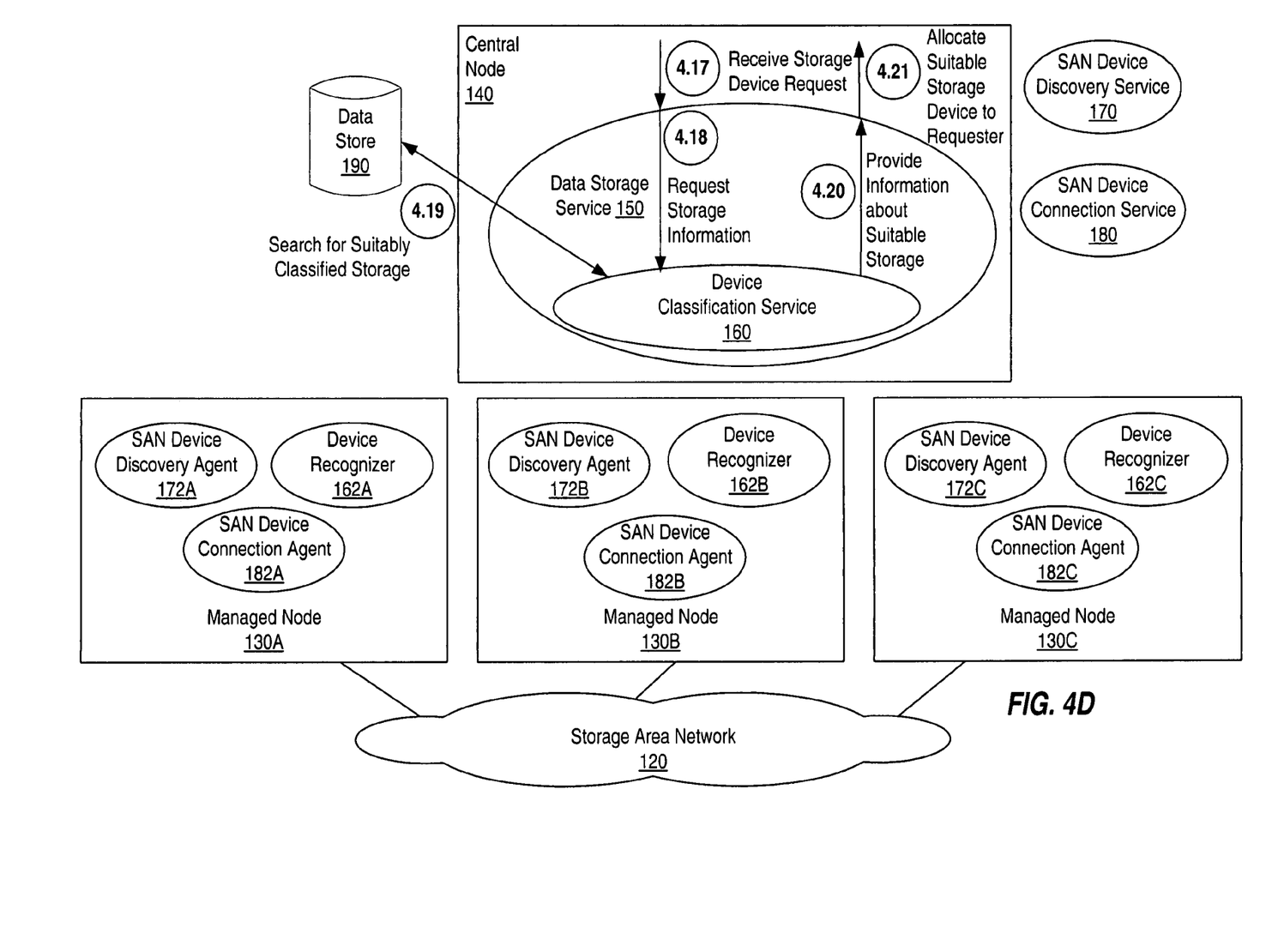
FIG. 4D shows an example of a data flow in allocating a disk for data storage.

FIG. 4D shows an example of a data flow in allocating a disk for data storage. In action 4.17, data storage service 150 running on central node 140 receives a request for storage device(s). The request may include information about the requester so that suitably classified storage can be identified. In action 4.18, data storage service 150 requests storage information from device classification service 160. In action 4.19, device classification service 160 searches data store 190 for suitably classified storage device(s) and, in action 4.20, provides information about the suitable storage device(s) to data storage service 150. In action 4.21, data storage service 150 allocates the identified suitable storage device(s) to the requester. By using persistently-stored disk classification information, access to a given device can be granted upon the device's addition or reconfiguration on the SAN and prior to allocation of the device for data storage.

The following section discusses in further detail the operation of a service, such as SAN device connection service 180, to establish access to a device for a node.

Connection Service to Establish Access to a Device for a Node

Figure 5A:
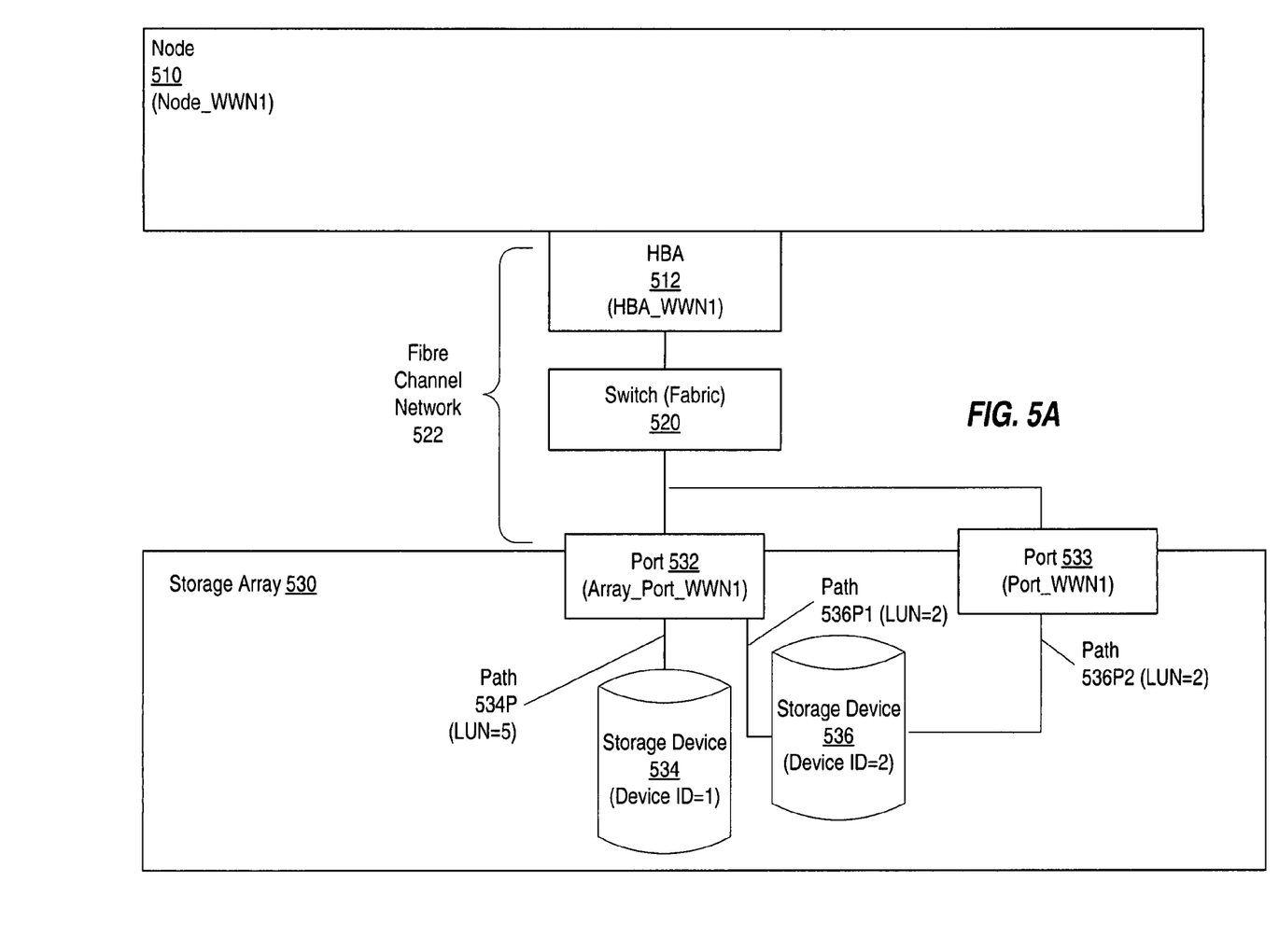
FIG. 5A provides an example of a storage area network (SAN) environment in which the present invention operates.

FIG. 5A provides an example of a storage area network (SAN) environment 500 in which the present invention operates. Node 510 serves as a host/server for an application program used by one or more clients (not shown). Host Bus Adapter (HBA) 512 is an interconnect entity between node 510 and fibre channel network 522. An HBA such as HBA 512 is typically a separate card in the host computer system.

Fibre channel switch 520 can be considered to represent the SAN fabric for the fibre channel network 522 corresponding to the SAN. At startup time, typically every node or device on a fibre channel network logs on, providing an identity and a startup address. A fibre channel switch, such as switch 520, catalogs the names of all visible devices and nodes and can direct messages between any two points in the fibre channel network 522. For example, some switches can connect up to $2^{24}$ devices in a cross-point switched configuration. The benefit of this topology is that many devices can communicate at the same time and the media can be shared. Sharing media, however, requires proper access control to ensure that an application program does not overwrite another application program's data. Redundant fabric for high-availability environments is constructed by connecting multiple switches, such as switch 520, to multiple nodes, such as node 510.

Storage array 530 is an array of multiple storage devices, of which storage devices 534 and 536 are examples. Storage device 534 has a device_ID of 1, and storage device 536 has a device_ID of 2. These device_IDs are examples of the globally unique identifiers assigned for devices on the SAN by a service such as SAN device discovery service 170. Storage array 530 is connected to the fibre channel network 522 via two ports, array ports 532 and 533. The path 534P1 between array port 532 and storage device 534 is referred to as a logical unit having a Logical Unit Number (LUN). Each of path 536P1 between array port 532 and storage device 536 and path 536P2 between array port 533 and storage device 536 has a LUN of 2, since each path connects storage device 536 to a respective array port. Because two paths exist to storage device 536, one path can fail and storage device 536 will remain accessible. Having access to a path, such as path 534P, or to a storage device accessible via the path, such as storage device 534, is commonly described as having access to the LUN.

Within a fibre channel network such as fibre channel network 522 of FIG. 5A, fibre channel addresses correspond to World Wide Names (WWNs). A WWN is a unique identifier that is assigned to a node and/or port in a fibre channel network. In some environments, a node and its corresponding port may have the same WWN, and in other environments, two WWNs are used. In this example, HBA 512 has an HBA WWN (HBW_WWN1), and each of array ports 532 and 533 has an Array Port WWN (respectively, Port_WWN1 and Port-WWN2).

Within a node, such as node 510, and within a storage array, such as storage array 530, SCSI addressing is used instead of World Wide Names. A node, such as node 510, accesses input and output devices using SCSI LUNs. Part of the complexity of allocating storage on a SAN to a node is due to the fact that an addressing scheme based on World Wide names (WWNs) is used for a storage area network, whereas SCSI addressing continues to be used for local storage.

On a SAN, a host computer system generates SCSI logical unit numbers (LUNs) for the devices that are directly controlled by the host and uses those SCSI LUNs to access the devices under control of the host computer system. However, a SAN may include a storage array, which controls a group of storage devices within the storage array. Intelligent logic within the storage array generates LUNs for the storage devices within the storage array. To access a particular device within a storage array, a node needs both an address for a port for the storage array as well as an individual LUN generated by the storage array for that particular device. For example, in FIG. 5A, to access storage device 536, node 510 needs the address of either port 532 or port 533 and the LUN (having a value of 2) generated by storage array 530.

When a new path to a storage device and/or a new storage device is added, a new LUN for the path/device is generated by the storage array. The new LUN can be added to the storage array access control information as a portbinding definition. Portbinding establishes a connection between an array port on a SAN and a storage device accessible via the array port. A portbinding definition typically includes the array port WWN, a device ID for the storage device, and a LUN (generated by the storage array) for the path from the array port to the storage device.

For a node to have permission to write data to and/or read data from a storage device in an array, the node generates a SCSI target that is mapped to an array port corresponding to the storage device. These targets may be persistently bound to the array port to ensure that the same target is used consistently, even when the node is re-initialized. Once the mapping from the target to the array port is made, all storage devices accessible via the array port have the same target. To selectively map a node to some, but not all, of the storage devices accessible via the array port, each LUN associated with the array port can be mapped to the target as well. The LUNs generated by the storage array are "discovered" and provided to the node to perform this mapping to the target.

Discovering and providing the LUNs generated by the storage array to the node has heretofore been performed manually. To enable a node to access a storage device, typically numerous configuration files and/or access control files must be adjusted to enable access of the storage device across the underlying network and within the storage array.

Figure 5B:
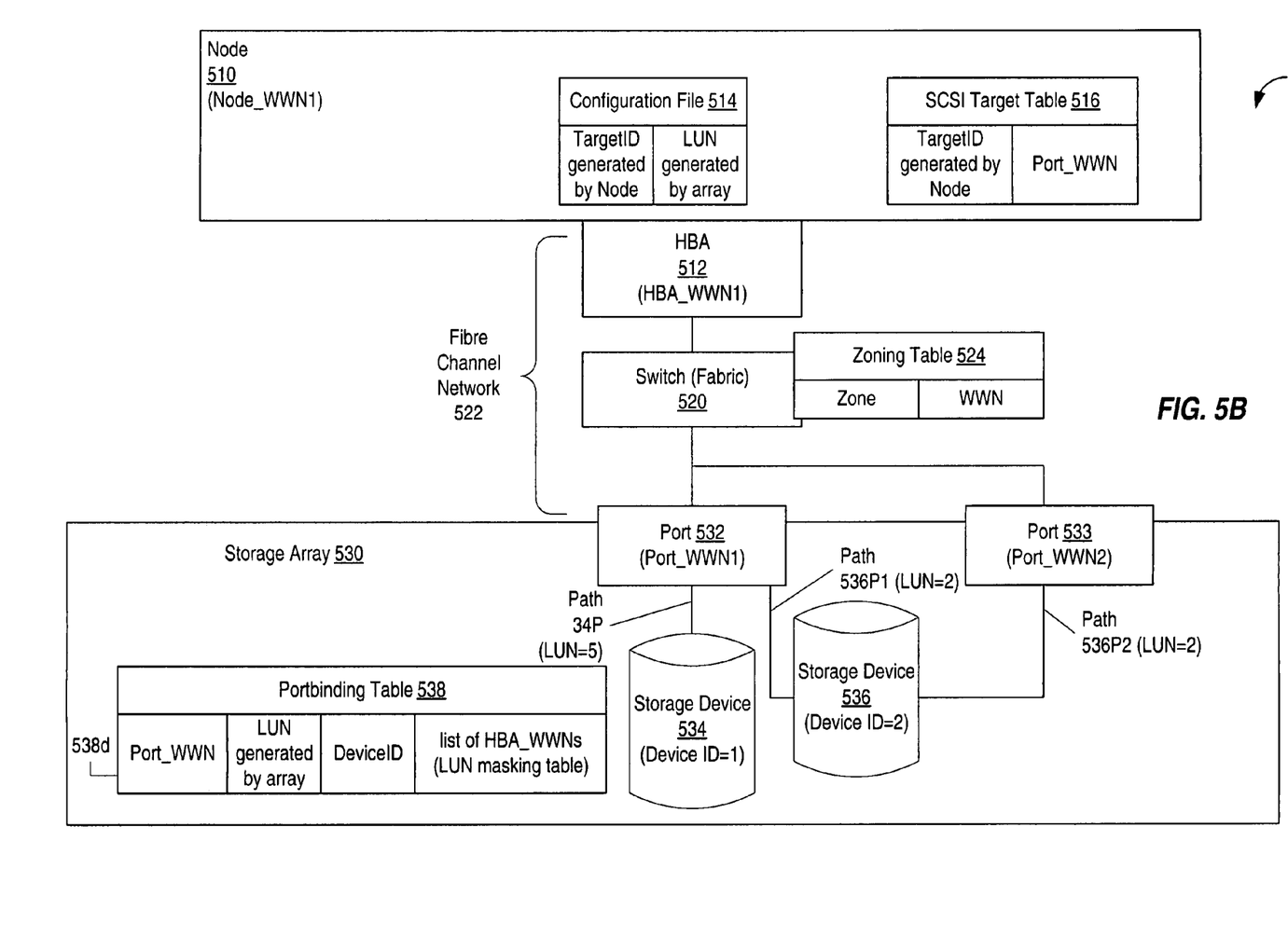
FIG. 5B shows examples of tables of data affected in one embodiment of the invention when a node is granted access to a disk on the SAN of FIG. 5A.

FIG. 5B shows examples of tables of data affected in one embodiment of the invention when a node is granted access to a disk on the SAN of FIG. 5A. For example, storage array 530 generates LUNs for devices, including a LUN of 5 for storage device 534 and a LUN of 2 for storage device 536. These LUNs may be stored in a table referred to as a "portbinding table," which provides a mapping from LUNs to array ports. Portbinding table 538 contains instances of portbinding definitions, such as portbinding definition 538d. Portbinding definition 538d includes the following variables: a port WWN for access to each particular LUN, the LUN itself, a device ID (which is unique across the SAN), and a list of HBA WWNs having access to the portbinding definition. (This list of HBA WWNs is also referred to as a LUN masking table; each portbinding definition has its own respective LUN masking table.)

Another table involved in granting access to a disk by a node is a SCSI target table. In FIG. 5B, SCSI target table 516 is generated by node 510, which includes the target identifiers generated by node 510 and corresponding port WWNs for each target identifier. Array-generated LUNs for each storage device are mapped to a SCSI target on node 510, as represented by configuration file 514.

Another table involved in controlling access to devices is a zoning table. In FIG. 5B, switch 520 maintains zoning table 524, which includes each WWN and an assigned zone. To access a device, a node must be included in the zone to which the device is assigned.

In a SAN having a large number of devices provided by different vendors, making a seemingly simple change to the SAN access control can be very complicated. Typically, the administrator obtains SCSI addressing information using a different API or GUI for each vendor and provides that SCSI addressing information to other components of the SAN using those components' own native API or GUI. These APIs and GUIs are usually vendor-specific and incompatible with each other. Often these changes cannot be made from a single computer system, such that the administrator manually writes down the addressing information and enters the data on another computer system.

Typically, mappings from SCSI targets to LUNs are contained in configuration information (such as configuration file 514) used for initializing a node upon booting the computer system or issuing an initialize command. For example, this configuration information is included in an sd.conf file on a node under the Solaris operating system. For the Windows 2000 operating system, configuration information is included in an internal data structure in the kernel.

Some operating systems provide a mapping from node target to storage array LUNs automatically, as well as an operating system handle that can be used by the node to access the storage devices accessible via the paths associated with the LUNs. However, other operating systems, such as Solaris, do not provide this mapping and OS handle. In these operating systems, the discovery of storage array LUNs and the extensive manual process described above to provide storage array LUNs to the node must be performed by the administrator to enable the node to access a storage device via the array port. One solution to this problem has been provided in co-pending U.S. patent application Ser. No. 10/160,735, entitled "Automatic Operating System Handle Creation in Response to Access Control Changes," filed May 31, 2002, and naming as inventors Sung-Wook Ryu, Lisa Jianli Zhang, and Bruce R. Rabe, the application being incorporated by reference herein in its entirety for all purposes.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
   detecting a storage device, wherein
      the storage device is accessible via a storage area network,
      the storage device is relocated in the storage area network, and
      the storage device has an unknown classification;
   establishing access to the storage device by a node of the storage area network;
   retrieving identifying data from the storage device;
   determining a classification of the storage device using classification information, wherein
      the classification information comprises
         a type of the storage device, and
         information regarding contents of the storage device, and
      the classification information is retrieved from a persistent data store using the identifying data;
   if the classification information is absent from the persistent data store, causing a recognizer on the node to access the storage device;
   storing the type of the storage device and the information about the contents in a persistent storage area of the storage area network;
   determining compatibility of the storage device with a requester, wherein the determining comprises
      checking the type of storage device for compatibility with the requester, and
      the requester makes a request for the storage device; and
   if the type of the storage device is compatible with the requester, establishing access to the storage device by the requester.

2. The method of claim 1 wherein the request for the storage device comprises
   a request for a specific property of the storage device, and
   the specific property is obtained from one of the type of the storage device and the information about the contents of the storage device.

3. The method of claim 1 wherein
   the establishing the access to the storage device by the node comprises
      forming a connection from the node to a target associated with the storage device.

4. The method of claim 3 wherein
   the connection is a TCP/IP connection;
   the target is an iSCSI target for the storage device; and
   the forming the connection comprises
      opening the TCP/IP connection between the node and the storage device.

5. The method of claim 4 wherein
the forming the connection comprises
configuring a path in the storage area network between the node and the storage device, and
configuring the node to access the storage device.

6. The method of claim 4 wherein
the determining the type of the storage device comprises issuing iSCSI commands to the storage device.

7. The method of claim 3 wherein
the forming the connection comprises
configuring a path in the storage area network between the node and the storage device,
configuring the node to access the storage device, and
opening the connection between the node and the storage device.

8. The method of claim 1 further comprising:
storing a type of the node in the persistent storage area.

9. The method of claim 1 further comprising:
generating an identifier from identifying data for the storage device;
searching for the identifying data in the persistent storage area; and
if the identifying data are found, retrieving the type of the storage device and the information about the contents from the persistent storage area.

10. The method of claim 1 wherein
the detecting the storage device is performed when a connection to the storage device is established in the storage area network.

11. The method of claim 1 wherein
determining the type of the storage device further comprises
identifying at least one of the following:
a device group to which the storage device belongs,
a name of a host of the storage device,
an identifier for the host of the storage device,
a domain identifier for a domain in which the storage device resides,
a central node identifier for a central node of the domain, and
an identifier for an HBA controller for the storage device.

12. The method of claim 1 wherein
determining the type of the storage device comprises
identifying a format of the storage device.

13. The method of claim 1 wherein
determining the type of the storage device comprises
identifying a signature of the storage device.

14. The method of claim 1 wherein
determining the type of the storage device comprises
identifying a storage manager that was used to configure the storage device.

15. The method of claim 1 further comprising:
determining if at least one node of the storage area network has access to the storage device; and
in response to determining that at least one node does not have access to the storage device, identifying at least one node to connect to the storage device.

16. The method of claim 1 further comprising:
retrieving the classification information from the persistent data store using the identifying data.

17. A system comprising:
means for detecting a storage device, wherein
the storage device is accessible via a storage area network,
the storage device is relocated in the storage area network, and
the storage device has an unknown classification;
means for establishing access to the storage device by a node of the storage area network;
means for retrieving identifying data from the storage device;
means for determining a classification of the storage device using classification information, wherein the classification information comprises
a type of the storage device, and
information regarding contents of the storage device, and
the classification information is retrieved from a persistent data store using the identifying data;
means to cause a recognizer on the node to access the storage device, if the classification information is absent from the persistent data store;
means for storing the type of the storage device and the information about the contents in a persistent storage area of the storage area network;
means for determining compatibility of the storage device with a requester, wherein
the means for determining compatibility of the storage device with the requester further comprises
means for checking the type of storage device for compatibility with the requester, and
the requester makes a request for the storage device; and
means for establishing access to the storage device by the requester if the type of the storage device is compatible with the requester.

18. The system of claim 17 wherein
the request for the storage device comprises
a request for a specific property of the storage device, wherein
the specific property is obtained from one of
the type of the storage device, and
the information about the contents of the storage device.

19. The system of claim 17 wherein
the means for establishing access further comprises
means for forming a connection from the node to a target associated with the storage device.

20. The system of claim 17 further comprising:
means for determining if at least one node of the storage area network has access to the storage device; and
means for identifying at least one node to connect to the storage device, in response to determining that at least one node does not have access to the storage device.

21. A computer program product comprising:
a plurality of instructions, comprising
a first set of instructions, executable on a computer system, configured to detect a storage device, wherein
the storage device is accessible via a storage area network,
the storage device is relocated from in the storage area network, and
the storage device has an unknown classification,
a second set of instructions, executable on the computer system, configured to establish access to the storage device by a node of the storage area network,
a third set of instructions, executable on the computer system, configured to retrieve identifying data from the storage device,
a fourth set of instructions, executable on the computer system, configured to determine a classification of the storage device using classification information, wherein the classification information comprises
a type of the storage device, and
information about contents of the storage device, and the classification information is retrieved from a persistent data store using the identifying data, a fifth set of instructions executable on the computer system, configured to cause a recognizer on the node to access the storage device, if the classification information is absent from the persistent data store, a sixth set of instructions, executable on the computer system, configured to store the type of the storage device and the information about the contents in a persistent storage area of the storage area network, a seventh set of instructions, executable on the computer system, configured to determine compatibility of the storage device with a requester, wherein the seventh set of instructions further comprises a first subset of instructions, executable on the computer systems configured to check the type of storage device for compatibility with the requester, and the requester makes a request for the storage device, and an eighth set of instructions, executable on the computer system, configured to establish access to the storage device by the requester if the type of the storage device is compatible with the requester; and computer-readable storage media, wherein the instructions are encoded in the computer-readable storage media.

22. The computer program product of claim 21 wherein the request for the storage device comprises a request for a specific property of the storage device, and the specific property is obtained from one of the type of the storage device, and the information about the contents of the storage device.

23. The computer program product of claim 21 wherein the second set of instructions further comprises a first subset of instructions, executable on the computer system, configured to form a connection from the node to a target associated with the storage device.

24. A computer system comprising:

a processor; and the computer-readable storage media of claim 21 wherein the computer-readable storage media is coupled to the processor.

25. The computer program product of claim 21 further comprising:

a ninth set of instructions, executable on the computer system, configured to determine if at least one node of the storage area network has access to the storage device; and a tenth set of instructions, executable on the computer system, configured to identify at least one node to connect to the storage device, in response to determining that at least one node does not have access to the storage device.

26. A system comprising:

a detecting module for detecting a storage device, wherein the storage device is accessible via a storage area network, the storage device is relocated in the storage area network, and the storage device has an unknown classification;

a first establishing module for establishing access to the storage device by a node of the storage area network;

a retrieving module for retrieving identifying data from the storage device;

a determining module for determining a classification of the storage device using classification information, wherein the classification information comprises a type of the storage device, and information regarding contents of the storage device, and the classification information is retrieved from a persistent data store using the identifying data;

a causing module to cause a recognizer on the node to access the storage device, if the classification information is absent from the persistent data store;

a storing module for storing the type of the storage device and the information about the contents in a persistent storage area of the storage area network;

a determining module for determining compatibility of the storage device with a requester, wherein the determining module comprises checking instructions for checking the type of storage device for compatibility with the requester, and the requester makes a request for the storage device; and a second establishing module for establishing access to the storage device by the requester if the type of the storage device is compatible with the requester.

27. The system of claim 26 wherein the request for the storage device comprises a request for a specific property of the storage device, and the specific property is obtained from one of the type of the storage device, and the information about the contents of the storage device.

28. The system of claim 26 wherein the first establishing module further comprises a forming module for forming a connection from the node to a target associated with the storage device.

29. The system of claim 26 further comprising:

a determining module for determining if at least one node of the storage area network has access to the storage device; and an identifying module for identifying at least one node to connect to the storage device, in response to determining that at least one node does not have access to the storage device.

* * * * *